B. ZINKE.
PISTON ROD COUPLING.
APPLICATION FILED SEPT. 11, 1907.
919,112.
Patented Apr. 20, 1909.
2 SHEETS—SHEET 1.
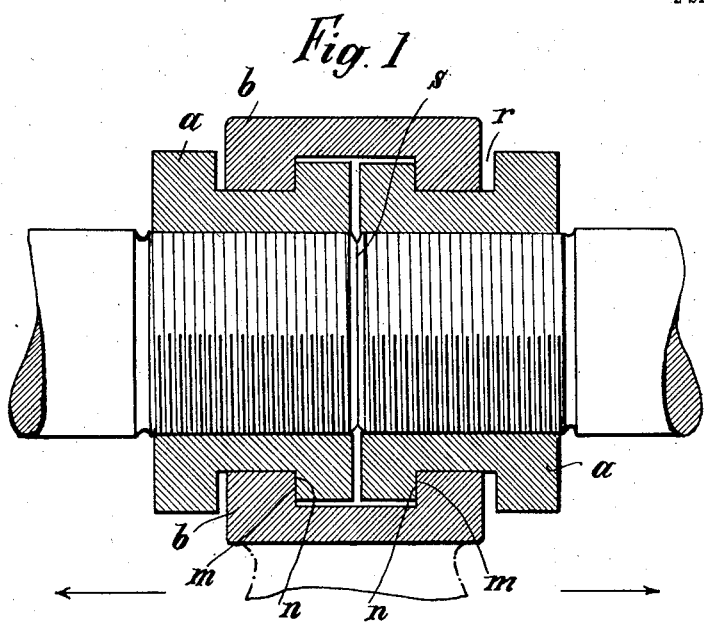
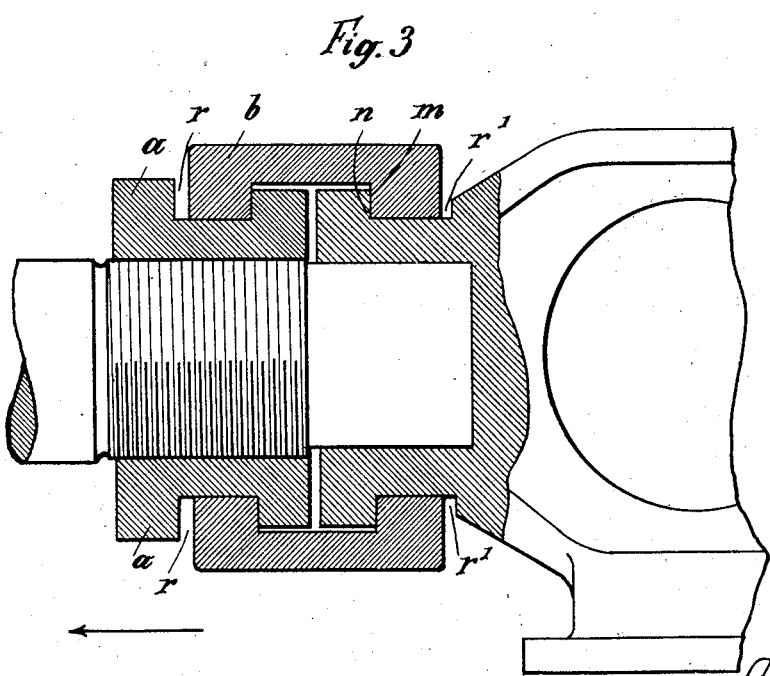

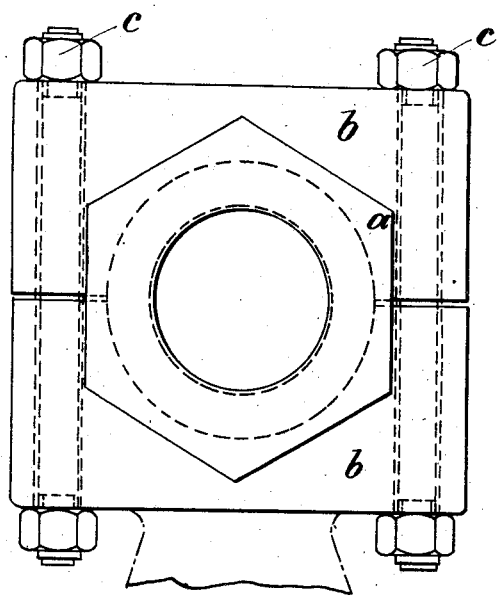
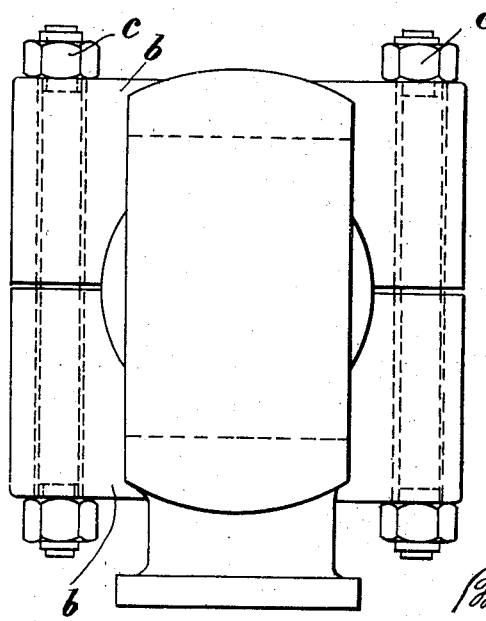

UNITED STATES PATENT OFFICE.

BRUNO ZINKE, OF SAARBRÜCKEN, GERMANY.

PISTON-ROD COUPLING.

No. 919,112.  Specification of Letters Patent.  Patented April 20, 1909.

Application filed September 11, 1907. Serial No. 392,353.

*To all whom it may concern:*

Be it known that I, BRUNO ZINKE, a subject of the German Emperor, and residing at Louisenstrasse 8, Saarbrücken, Germany, have invented certain new and useful Improvements in Piston-Rod Couplings, of which the following is a specification.

The present invention has for its object an improved coupling for piston-rods.

In order that the invention may be clearly understood reference is made to the accompanying drawing in which various embodiments are represented by way of example, and in which:

Figure 1 is a vertical sectional elevation, and Fig. 2 is an end elevation of one form; whereas Fig. 3 is a vertical sectional elevation, and Fig. 4 is an end elevation of a modified form.

The new coupling for connecting the ends of two piston-rods consists, as represented in Fig. 1, of two nuts $a$ screwed on to the end of the piston-rods; the nuts are shaped outside as represented in the drawing, i. e. they are in part cut away at the center of the periphery or in other words are provided with a groove-like incision $r$. Flange-like shoulders or projections of two halves $b$ of couplings engage in these incisions and are centric with the nuts, as Fig. 2 shows, and are held by screw-bolts $c$. The two piston-rods are joined by the two nuts $a$ being first screwed on to the rods; the piston-rods are then pushed together, so that they contact with their faces $s$. The two halves of the coupling are then placed around the nuts in the manner shown in the drawing and are connected with one another by the bolts $c$. Now in order to give this joint the necessary tension which is the first condition for the durability of such a coupling, one of the nuts, it being indifferent which of them, is screwed up in the direction of the arrow. The faces $m$, $n$ are thereby pressed firmly one on the other, and the coupling is finished. The coupling is undone by one of the nuts $a$ being loosened in the reverse direction, and by the two halves $b$ of the coupling being removed.

The special advantages of this coupling are: Greatest simplicity, absolute certainty of being able to loosen it, and very small length, as, in spite of the correct tension of the coupling, there is on each rod only one single nut of standard length.

The screw bolts $c$ may be made relatively weak, because there is no force there which presses the two halves of the couplnig apart.

The piston-rod is attached in a simple manner to the cross-head; the connection is likewise easily undone. The connection of piston-rod and cross-head is represented in Figs. 3 and 4. In this case the coupling consists of only one nut $a$ with incision $r$ as Fig. 3 shows. As a substitute for the other nut, the end of the cross-head is provided with a corresponding incision or groove $r^1$. As in the former case, two halves $b$ of the coupling, which, as Fig. 4 shows, are held together by screw-bolts $c$, are again placed onto the incisions.

It will be observed that in the embodiment of the invention shown in Fig. 1 the two coupled members are shafts which are in exact axial alinement with each other and are brought solidly in abutment by the screwing inwardly on the shaft of either one or both the clamping members $a$ which are in this instance in the form of nut-like collars and whose outer portions, i. e. the portions outside of the two part box $b$, are angular in shape to receive a tool.

In Fig. 3, where a shaft is to be coupled to a cross-head or other frame, the frame constitutes one of the coupled members and the shaft member is abutted directly thereagainst the frame being provided with a socket for the reception of the abutting end of the shaft. In this modification one of the clamping members $a$ is formed integral with the frame and is therefore non-rotatable and need not be threaded on the shaft, so that the clamping action can only be obtained by screwing up the nut-like clamping member threaded on the shaft.

What I claim as my invention and desire to secure by Letters Patent is:—

1. The combination of two shafts having their ends abutting and screw-threaded, a nut adjustably screwed on each threaded end and having an annular external groove, this groove forming oppositely-facing shoulders $n$, and a sectional coupling box removably secured around said nuts and having annular shoulders lying in said grooves and oppositely-facing walls $m$ abutting against said shoulders $n$, the end of one of said nuts being extended beyond the box and adapted to receive a turning tool, for the purpose set forth.

2. In a coupling of the class set forth, a pair of coupled members having their inner ends abutting and one at least having external screw-threads, a pair of clamping members one carried by each of said coupled members, the one carried by the threaded member being threaded internally so as to be adjustable thereon and each of said clamping members being annular in form and provided with an annular groove forming oppositely facing shoulders $n$, and a sectional box embracing said clamping members and having oppositely facing shoulders $m$ abutting against the respective aforesaid shoulders $n$, for the purpose set forth, the outer end of the threaded clamping member being extended beyond the box and formed to receive a turning tool.

In testimony whereof, I affix my signature in the presence of two witnesses.

BRUNO ZINKE.

Witnesses:
 FRANZ MILEWSKI,
 WALTER HAUSING.